(12) United States Patent
Connor et al.

(10) Patent No.: US 6,681,275 B2
(45) Date of Patent: Jan. 20, 2004

(54) METHOD AND APPARATUS FOR DYNAMIC COALESCING

(75) Inventors: Patrick L. Connor, Portland, OR (US); David S. Feldman, North Plains, OR (US)

(73) Assignee: Intel Corporation, Santa Clara, CA (US)

(*) Notice: Subject to any disclaimer, the term of this patent is extended or adjusted under 35 U.S.C. 154(b) by 243 days.

(21) Appl. No.: 09/961,108

(22) Filed: Sep. 20, 2001

(65) Prior Publication Data

US 2003/0056041 A1 Mar. 20, 2003

(51) Int. Cl.[7] .................. G06F 13/10; G06F 13/14
(52) U.S. Cl. .................. 710/58; 710/15; 710/16; 710/18; 710/60; 709/223

(58) Field of Search .................. 710/15, 16, 18, 710/58, 60; 709/223

(56) References Cited

U.S. PATENT DOCUMENTS

| | | | | |
|---|---|---|---|---|
| 5,687,391 A | * | 11/1997 | Judd et al. .................. | 710/15 |
| 5,933,594 A | * | 8/1999 | La Joie et al. .................. | 714/26 |
| 6,356,836 B1 | * | 3/2002 | Adolph .................. | 701/208 |
| 6,557,034 B1 | * | 4/2003 | Fujita et al. .................. | 709/223 |

\* cited by examiner

Primary Examiner—Rehana Perveen
(74) Attorney, Agent, or Firm—Blakely, Sokoloff, Taylor & Zafman LLP

(57) ABSTRACT

Numerous embodiments of a method and apparatus for dynamic coalescing are disclosed.

22 Claims, 5 Drawing Sheets

METHOD AND APPARATUS FOR DYNAMIC COALESCING

RELATED APPLICATION

This application is related to U.S. patent application Ser. No. 09/207,461, now U.S. Pat. No. 6,430,628, titled "Method and Apparatus for Smart Coalescing", by Patrick Connor, filed Dec. 8, 1998, assigned to the assignee of the present invention and herein incorporated by reference.

BACKGROUND

1. Field

This disclosure relates generally to computer input/output (I/O) devices.

2. Background Information

Computer networks are typically constructed by coupling two or more computers or computing platforms to a data transmission medium, such as category 5 (CAT-5) networking cabling. These computers or computing platforms typically access the transmission medium through an input/output (I/O) device, such as a network interface card (NIC), and typically, I/O devices are controlled by I/O device drivers. Data protocols may vary, but one such protocol comprises the Ethernet protocol, which, as is well known, is a packet-based protocol. The Ethernet protocol is defined in the Institute for Electrical and Electronics Engineers standard 802.3, 2000 edition, available from IEEE standards, 445 Hoes Lane, P.O. Box 1331, Piscataway, N.J., 08855-1331. Additional information can be found on the World Wide Web at the following URL: http://www.ieee.org. Recent developments in Ethernet technology have resulted in increases in potential data transfer speeds of electronic data. In this context, electronic data refers to one or more bits of digital data. These advances may result in network data transfer rates that exceed the data processing rates of computer system buses, which may result in a decrease in overall data transfer efficiency. A need exists for increased efficiency of data transfer between a computer system and a computer network.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

As is well-known, networks or computer networks comprise a distributed system of intercoupled data links, and typically at least in part facilitate the exchange of data between various locations or computers. Networks vary in size and speed of data transfer, and are becoming increasingly complex. Computer networks are typically comprised of one or more computers or computing platforms coupled to a transmission medium, which may comprise fiber optic cable, category 5 (CAT-5) networking cabling, wireless media, or any of a number of other types of transmission media. Computers coupled to a transmission medium may comprise servers, personal computers, routers, switches, hubs, or any number of other types of networking or computing platform. In this context, the term computing platform or device refers to any hardware and/or software based system that includes the capability to perform logic and/or arithmetic operations. It includes, without limitation, personal computers, laptop computers, servers, set-top boxes, hand-held devices, and numerous other types of systems. Additionally, there are several different types of networks, including Wide Area Networks (WAN) and Local Area Networks (LAN) to cite two possible examples.

Figure 1:
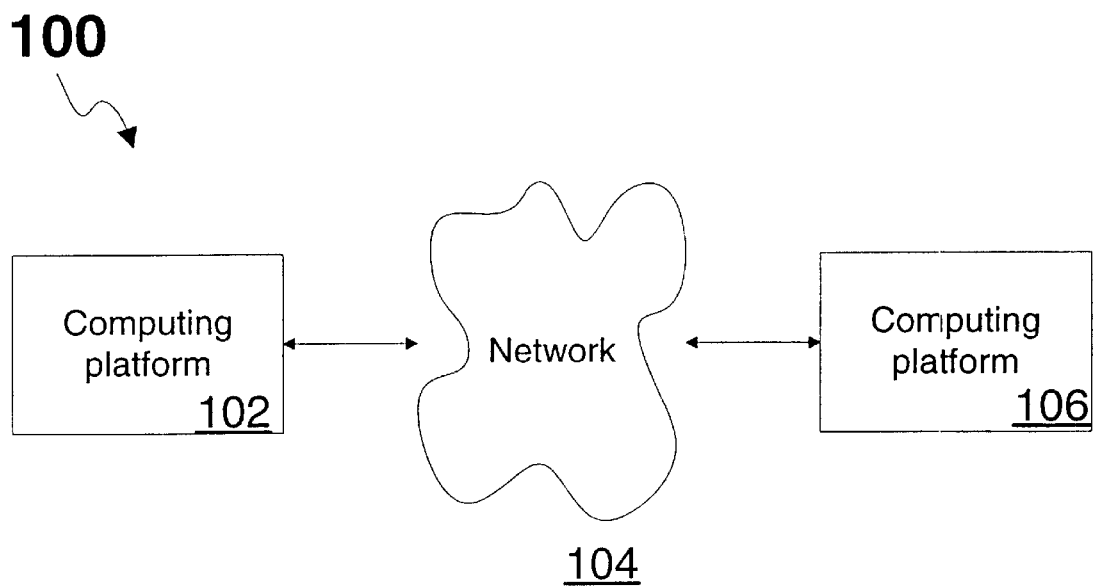
FIG. 1 is a schematic diagram of an embodiment of a computer network.

FIG. 1 illustrates an embodiment of a simple computer network 100. Network 100 comprises a computing platform 102 and a computing platform 106, which are coupled by network 104. Computing platforms 102 and 106 are not limited to any particular type of computing platform, as described previously. Similarly, network 104 is not limited to any particular type of network. Computing platforms 102 and 106 may be coupled to network 104 by an I/O device, such as a network interface card (NIC). Data may be transferred, in this embodiment, between 102 and 106, using a protocol such as the Ethernet protocol. It will, of course, be understood that computer network 100 described herein is just one embodiment, and the claimed subject matter is not limited to just this particular type of network.

Typically, although the claimed subject matter is not limited in this respect, computing platforms coupled to a transmission medium may be coupled through an input/output (I/O) device, such as a network interface card (NIC), which may alternatively be referred to as a server adapter, network adapter, or media access card, but the claimed subject matter is not limited in this respect. There are many types and categories of I/O devices, and the claimed subject matter is not limited to any particular type of I/O device. One such I/O device may comprise an Ethernet Media Access Controller (MAC), such as an Intel® 82543-GC Gigabit Controller. Such I/O devices typically manage data transfer between a computer and a network, using a media access control protocol. There are many versions of media access control protocols, including Ethernet and Gigabit Ethernet, which, as is well known, relate to a 10 and 1000 Megabits per second (Mb/s) rate of electronic data transfer, respectively, although it will be understood that there are many other types of media access control protocols that may be used in accordance with the claimed subject matter. I/O devices such as the type previously described typically operate by utilizing at least one device driver, although the claimed subject matter is not limited in this respect. In one embodiment, a device driver comprises a software program that at least partially provides commands to the I/O device, and manages the operation of the I/O device, and how the I/O device interacts with other components or systems coupled to a network. It will, of course, be understood that the claimed subject matter is not limited to any particular type of protocol. However, the Gigabit Ethernet protocol is defined for data transfer over fiber optic cable in the Institute of Electrical and Electronics Engineers (IEEE) standard 802.3z-1998, and for data transfer over CAT-5 cable in IEEE standard 802.3ab-1999. Details regarding this protocol can be obtained from IEEE Standards, 445 Hoes Lane, P.O. Box 1331, Piscataway, N.J. 08855-1331. Additional information can be found on the World Wide Web at the following URL: http://www.gigabit-ethernet.org.

Figure 5:
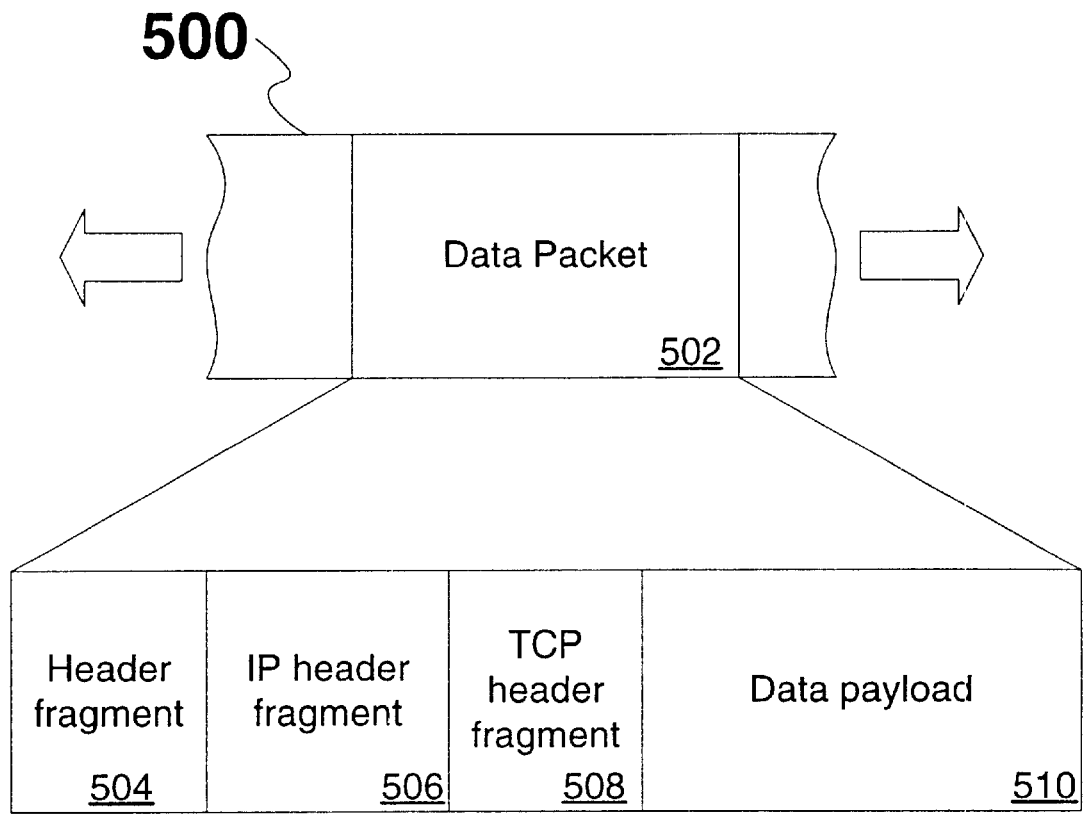
FIG. 5 is an embodiment of an Ethernet specification compliant packet in accordance with one embodiment of the claimed subject matter.

As is well known, Ethernet is a packet-based protocol, and, in this context, a packet refers to one or more fragments of electronic data. A fragment of electronic data, in this context, comprises a contiguous sequence of digital data pulses. Packets in Ethernet typically utilize Transport Control Protocol/Internet Protocol (TCP/IP), and this protocol typically comprises fragments of electronic data comprising a packet header, an IP header, a TCP header, and one or more additional data fragments. Details regarding TCP/IP may be obtained by referencing Request for Comments (RFC) 1180, January 1991. RFC 1180 may be obtained from the World Wide Web at the following URL: www.freesoft.org. I/O devices will typically send and receive packets derived from these data fragments, such as the ones described, in operation. FIG. 5 provides one possible embodiment of an Ethernet protocol compliant or Ethernet packet 500. 502 represents a data packet, which, as stated previously, will typically comprise a packet header fragment 504, which may typically comprise 14 bytes of data. 506 and 508 represent an IP header fragment and a TCP header fragment, respectively, each of which may typically comprise 20 bytes of data. 510 represents additional data fragments, which may comprise between 1 and 1460 bytes of data. It will, of course, be understood that this is just one possible embodiment of a packet, and the claimed subject matter is not limited to just this type of packet or to Ethernet packets.

In operation, prior to transmitting a packet across a network, an I/O device typically reads one or more data fragments that comprise a packet from a computing platform memory. In the process of reading one or more data fragments from a computing platform or other device, an I/O device may move one or more data fragments from various locations in a device's memory to one or more memory locations on an I/O device. In operation, an I/O device will typically utilize sub-systems of a computing platform or network device in order to receive one or more data fragments, where the utilization of one or more sub-systems is typically coordinated and managed by a device driver of the I/O device. Two such sub-systems may comprise the memory sub-system, and the bus sub-system. However, the claimed subject matter is not limited to utilization of just these sub-systems, and may, in one embodiment, not utilize any such sub-systems or employ a device driver. In one such embodiment, however, the memory sub-system comprises machine-readable media, such as dynamic random access memory (DRAM), and the bus sub-system comprises a system bus, such as a Peripheral Component Interconnect (PCI) version 2.2 protocol specification compliant or PCI-X version 1.0a protocol specification compliant bus, as well as bus software for accessing one or more computing system devices that may be coupled to the system bus, although the claimed subject matter is not limited to any particular type of data gathering or copying, as described in detail hereinafter. Information regarding the PCI version 2.2 and PCI-X version 1.0a specification can be obtained from the PCI special interest group (PCI-SIG), 5440 SW Westgate Dr., 217, Portland, Oreg. 97221. Additional information can be obtained at the PCI-SIG website on the World Wide Web at the following URL: www.pcisig.com.

There are a variety of methods that may be incorporated in order to transfer data fragments from a computing system to a network device's memory, many of which are well known in the art. One method incorporates one or more direct memory access (DMA) transfers. In this method, the I/O device receives a list of memory addresses for data fragments located in a device's memory. The I/O device will then interrupt a device processor, and transfer at least a portion of the data fragment to an I/O device memory. Of course, the claimed subject matter is not limited to just this type of data transfer. DMA transfers are typically managed, or controlled, by the computing platform or networking device, and are typically requested by the I/O device. A DMA will typically utilize arbitration and addressing, which, in this context, may be referred to as overhead. In this context, arbitration comprises the process of the I/O device gaining access to a computing platform bus, and typically will vary in the amount of time employed to complete for a DMA transfer. Addressing refers to informing the memory subsystem of the location of the fragment to be read.

An alternative method for transferring data fragments from a computing platform memory to a network device's memory may comprise the I/O device receiving a list of memory addresses for multiple data fragments located in one or more different locations in a device's memory. The I/O device's driver will copy one or more data fragments in different memory locations into a memory buffer, typically referred to as a coalesce buffer. The I/O device will then interrupt the processor, and transfer at least a portion of the coalesced data to the I/O device memory, wherein at least a portion of the coalesced data fragment will be transferred across a network. Coalescing, in this context, refers to the gathering together into a single memory location two or more data fragments, that may be located in different memory locations. This particular method will typically reduce the amount of overhead that may be associated with a method of data transfer compared to a method that does not use coalescing, provided there is more than one fragment of data that is coalesced into the coalesce buffer. This is due, at least in part, to the fact that typically arbitration and addressing will only have to be performed once for the coalesced data, rather than for each fragment of electronic data. The above-described method may, however, increase processor utilization, explained in more detail hereinafter.

One embodiment of a method of coalescing may comprise a method of selectively coalescing data fragments depending, at least in part, on the fragment size and may be based in part on one or more other factors such as the size of adjacent data fragments, memory speed, data fragment location, or any number of other factors. It will of course be understood that the claimed subject matter is not limited in this respect. At least one such method of selectively coalescing data fragments based upon one or more of the aforementioned factors may be found in the above-referenced U.S. patent application Ser. No. 09/207,461, titled "Method and Apparatus for Smart Coalescing", by Patrick Connor, filed Dec. 8, 1998 (attorney docket number 042390.8182). It will, of course, be understood that the claimed subject matter is not limited to this type of coalescing, but many alternative methods for coalescing or equivalents of coalescing may be used in accordance with the claimed subject matter.

As is well known, performance of network interface devices may be measured by varying techniques. One such technique employs a metric referred to as the Performance Efficiency (PE) ratio. This ratio is a measure of the throughput, or data transfer rate from a computing platform, in Megabits per second, to processor utilization percentage. For example, a 100 Mb/s data transfer that utilizes 50% of the processor results in a PE ratio of 2.0. This metric emphasizes the desirability of balancing I/O speed with processor utilization. It will, of course, be understood that neither this performance metric, nor any particular performance metric is required in order to practice the claimed subject matter.

In one embodiment, a method and/or apparatus for dynamic coalescing manages data transfer based at least in part on the data transfer rate of an I/O device, and the data processing speed of an associated system bus. In this particular embodiment, the data transfer rate, which may also be referred to as the wire speed or output speed, may be determined at least in part by the I/O device data transfer rate setting. The data transfer rate is typically measured in Mb/s, although the claimed subject matter is not limited in this respect. The transfer rate setting may be set by a user, by the computing platform, by a device driver, or any number of other methods, but the claimed subject matter is not limited to any particular method for setting the output speed. In this particular embodiment, the data processing speed of an associated system bus refers to the data transfer rate of a bus of a computing system coupled to an I/O device, which, as stated earlier, may comprise a computing system bus. Data processing speed may be determined by a variety of methods. One such method is accomplished by determining the type of chipset used by the computing platform to determine a theoretical maximum data transfer rate or processing speed. For example, a 64-bit PCI protocol specification compliant bus running at 64 MHz would deliver a theoretical maximum of 528 Megabytes per second. However, the claimed subject matter is not limited in scope to utilizing the chipset properties to determine processing speed of an associated system bus. For example, a user may determine the approximate processing speed by referencing a processor specification, the processing speed may be determined by properties, such as bus clock speed and bus width, or a bus master could additionally measure the bus utilization of other devices coupled to the bus to determine available bus bandwidth. It will, of course, be understood that these are merely examples, and the claimed subject matter is not limited in scope to any particular measuring or approximating method for determining the data processing speed of an associated system bus.

Figure 2:
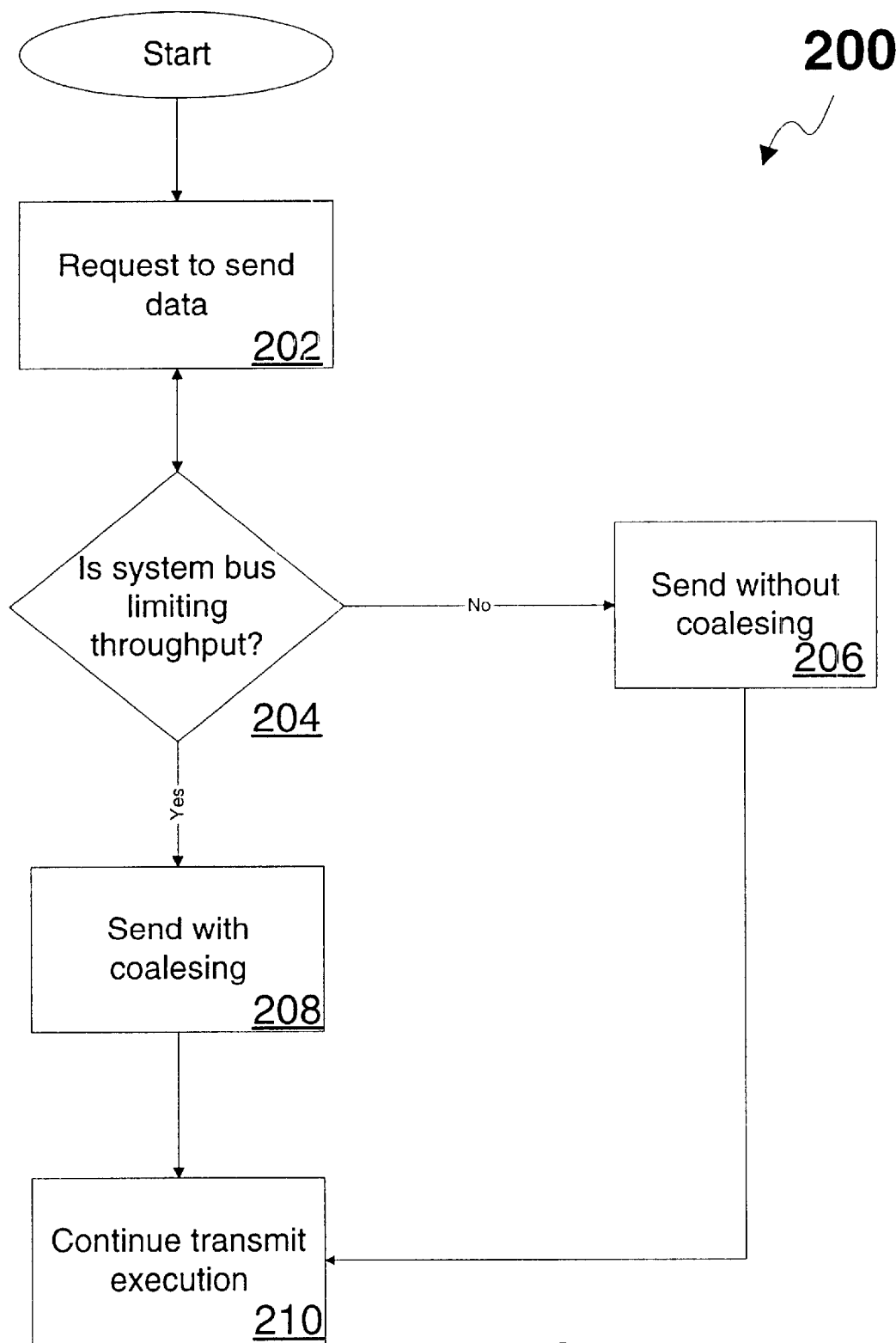
FIG. 2 is a flowchart illustrating one embodiment of the claimed subject matter.

FIG. 2 is a flowchart representing one embodiment of a method for dynamic coalescing in accordance with the claimed subject matter. Computing platform processing speed is utilized in this embodiment of the claimed subject matter. Block 202 is a request to send data, which may be initiated by the I/O device, but the claimed subject matter is not limited in this respect. Once a request to send data is received this embodiment of a method for dynamic coalescing determines if the computing platform bus is limiting throughput, or data transfer rate, represented herein by block 204. This may be accomplished by comparing actual data transfer rate with a theoretical or desired value of data transfer rate, or by determining how much data is queued on an I/O device and comparing that to a threshold value, or by the methods described above. If the system bus is not limiting throughput, then block 206 gives instructions to the I/O device to send the data without coalescing, and the transmit execution flow will continue, as represented by 210. If, however, the system bus is limiting throughput, then the I/O device will receive instructions, represented by block 208, to send the data with coalescing. Coalescing may be performed by any of a number of approaches including the above-described methods.

Figure 3:
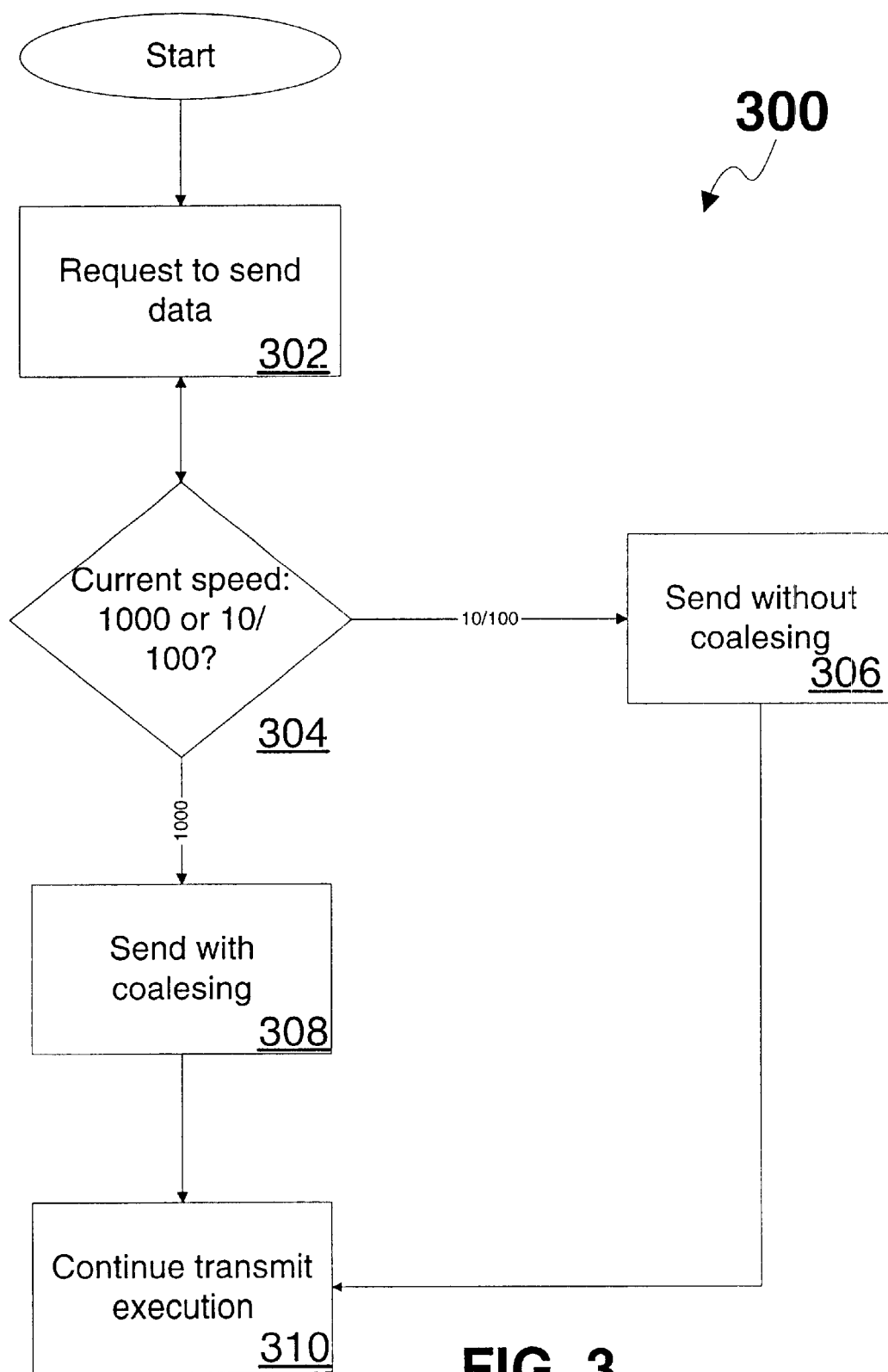
FIG. 3 is a flowchart illustrating another embodiment of the claimed subject matter.

FIG. 3 represents an alternative embodiment of the claimed subject matter. Block 302 represents a request to send data, which may be initiated by the I/O device or the computing platform, although the claimed subject matter is not limited in this respect. Once a request to send data is received, this embodiment of a method for dynamic coalescing, in block 304 determines what the current data transfer rate is, by any of the methods described above, or by any number of other methods. In this embodiment, if the method for dynamic coalescing determines that the data transfer rate is 1000 Mb/s, then block 308 instructs the I/O device to send at least a portion of the data with coalescing, wherein the coalescing may be performed by any of the methods described herein, or any number of other methods. If the speed is determined to be 10 or 100 Mb/s, then block 306 instructs the I/O device to send the data without coalescing. Of course, it will be understood that this is just one embodiment of the method for dynamic coalescing, and the claimed subject matter is not limited to any of the above-described methods.

In an alternative embodiment of a method and/or apparatus for dynamic coalescing, a user may determine, at least in part, whether to coalesce data fragments. In this alternative embodiment, a user may determine whether or not to activate data coalescing based, at least in part, on the amount of processor utilization desired, the amount of data transfer rate desired, or any number of other factors. It will, of course, be understood that the claimed subject matter is not limited to any particular criteria for determining whether to utilize coalescing. For example, it may be desirable to not use coalescing if a processor is performing other tasks, or if data transfer rate is not particularly important. In this particular embodiment, any sort of manual setting may be utilized to initiate data coalescing, and still be in accordance with the claimed subject matter.

In yet another alternative embodiment of a method and/or apparatus for dynamic coalescing, a data transfer rate setting may be omitted. There are numerous ways in which to determine the I/O device transfer rate in accordance with the claimed subject matter without utilizing a setting. For example, the transfer rate could be based on specified properties of a component coupled to the computing platform, such as, for example, the I/O device specified data transfer rate. Alternatively, a PING could be sent across an associated network in order to determine the real time data transfer rate across the network. As is well known, this may be employed to measure the round trip time of a fragment of electronic data of known size, and approximate a data transfer rate based at least in part on this information. Of course, it will be understood that the claimed subject matter is not limited to just these examples.

Figure 4:
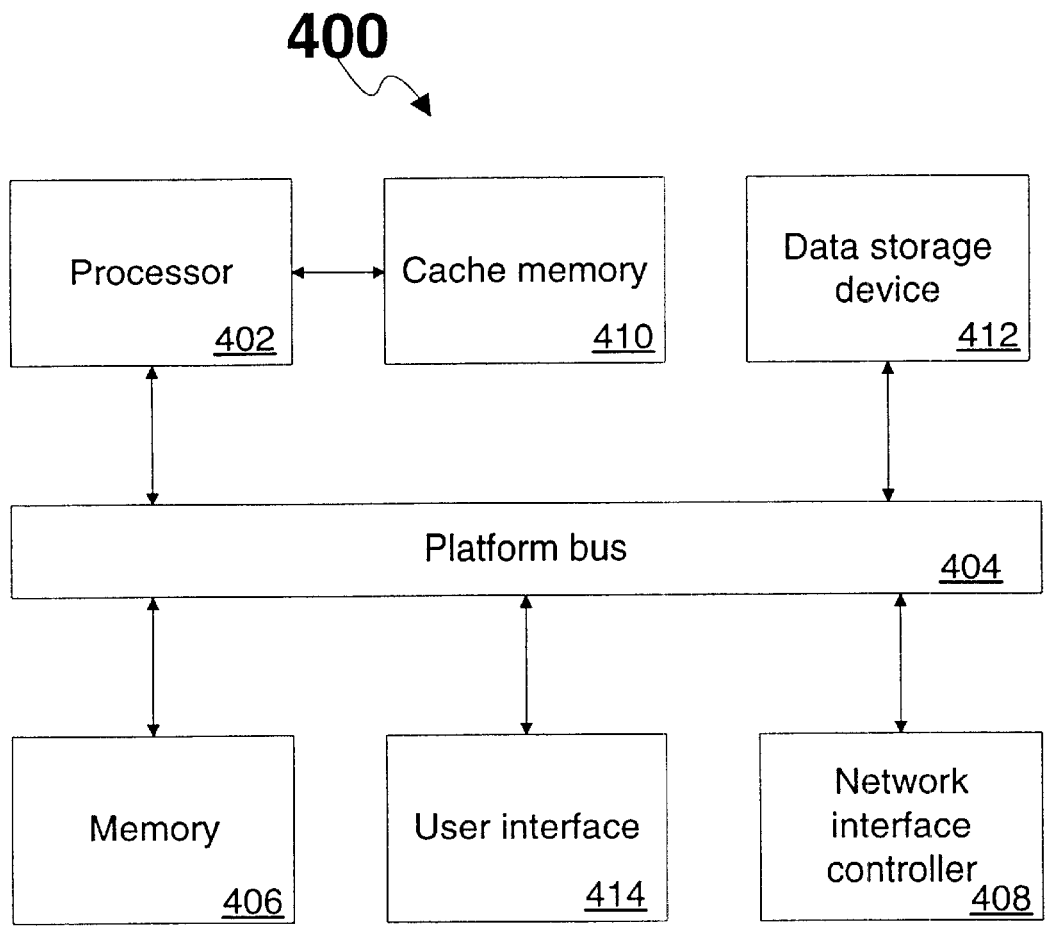
FIG. 4 is a diagram of an embodiment of a computing platform.

Embodiments of the claimed subject matter may be implemented in hardware or software, or a combination of both. Embodiments of the claimed subject matter may be implemented as a computer program executing on a computing system, comprised of at least one processor, a data storage system, which includes volatile and non-volatile memory and/or storage elements, at least one input device, and at least one output device. FIG. 4 is a block diagram of one embodiment of a system 400. System 400 includes a processor 402 that processes data signals, and may comprise, for example, a PENTIUM®III or PENTIUM® 4 microprocessor available from Intel Corporation. Processor 402 may be coupled to a processor bus 404 that transmits data signals between processor 402 and other components in the system 400. System 400 includes a memory 406. Memory 406 may store instructions and/or data represented by data signals that may be executed by processor 402. The instructions and/or data may comprise code for performing any and/or all of the techniques of the claimed subject matter. Memory 406 may also contain additional software and/or data in accordance with this embodiment, including device drivers for associated components. Software alternatively may be stored on a data storage device 412, such as, for example, a floppy disk drive, a read only memory (ROM), a CD-ROM device, a flash memory device, a digital versatile disk (DVD), or other storage device. A cache memory 410 may reside inside processor 402 that stores data signals stored in memory 406. An I/O device, such as a network controller 408, may be coupled to the processor bus 404. A user interface 414 may be coupled to the processor bus 404, and typically will allow a user to gain access to one or more components of system 400. A processing system includes any system that has a processor, such as, for example, a digital signal processor (DSP), a microcontroller, an application specific integrated circuit (ASIC), or a microprocessor.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. An apparatus for managing electronic data comprising:
   an input/output (I/O) device;
   said I/O device having the capability to combine one or more fragments of electronic data, based at least in part on the data transfer rate of said I/O device and the data processing speed of an associated system bus, wherein said associated system comprises a computing platform coupled to said I/O device.

2. The apparatus of claim 1, wherein said I/O device has the capability to determine whether or not to combine data by comparing said data transfer rate with said associated system bus data processing speed.

3. The apparatus of claim 2, wherein said I/O device has the capability to combine one or more data fragments if said data transfer rate is approximately equal to said associated system bus data processing speed.

4. The apparatus of claim 2, wherein said I/O device has the capability to combine one or more data fragments if said data transfer rate exceeds said associated system bus data processing speed.

5. The apparatus of claim 1, wherein said I/O device is capable of retrieving said one or more fragments of electronic data from an associated computer platform memory.

6. The apparatus of claim 1, wherein said system bus comprises a peripheral component interconnect (PCI) protocol specification compliant or PCI-X protocol specification compliant bus.

7. The apparatus of claim 1, wherein said I/O device is configured to allow a user to determine whether to coalesce one or more data fragments.

8. A method of managing electronic data transfers comprising:
   substantially determining a data transfer rate of an I/O device;
   substantially determining a data processing speed of an associated computing system bus; and
   combining one or more fragments of electronic data, based at least in part on said data transfer rate of said I/O device, and the data processing speed of said associated computing system bus, wherein said associated system comprises a computing platform coupled to said I/O device.

9. The method of claim 8, wherein said I/O device determines whether or not to combine data by comparing said data transfer rate with said data processing speed of an associated computing system bus.

10. The method of claim 9, wherein said determining comprises combining one or more data fragments if said data transfer rate is approximately equal to said associated system bus data processing speed.

11. The method of claim 9, wherein said determining comprises combining one or more data fragments if said data transfer rate exceeds said associated system bus data processing speed.

12. The method of claim 8, wherein said fragments of electronic data are stored on an associated computer platform memory.

13. The method of claim 8, wherein said system bus comprises a peripheral component interconnect (PCI) protocol specification compliant or PCI-X protocol specification compliant bus.

14. An article comprising:
   a storage medium;
   said storage medium having stored thereon instructions, that when executed, result in execution of a method of dynamic coalescing, by combining one or more fragments of electronic data, based at least in part on the data transfer rate of an I/O device and the processing speed of an associated system bus, wherein said associated system comprises a computing platform coupled to said I/O device.

15. The article of claim 14, wherein said instructions, when executed, further result in said combining of one or more fragments of electronic data by comparing said data transfer rate with said data processing speed of an associated computing system bus.

16. The article of claim 15, wherein said instructions, when executed, further result in said combining one or more data fragments if said data transfer rate is approximately equal to said associated system bus data processing speed.

17. The article of claim 15, wherein said instructions, when executed, further result in said combining one or more data fragments if said data transfer rate exceeds said associated system bus data processing speed.

18. The article of claim 14, wherein said instructions, when executed, further result in said fragments of electronic data being located on an associated computer platform memory.

19. The article of claim 14, wherein said instructions, when executed, further result in said data transfer rate comprising the connection speed to a network in bits per second, wherein said network is coupled to said I/O device.

20. The article of claim 14, wherein said instructions, when executed, further result in said associated system bus data processing speed comprising a measure in bits per second of data transfer between two locations on said system bus.

21. The article of claim 14, wherein said system bus comprises a peripheral component interconnect (PCI) protocol specification compliant or PCI-X protocol specification compliant bus.

22. The article of claim 14, wherein said instructions, when executed, further result in said I/O device being configured to allow a user to determine whether to coalesce one or more data fragments.

* * * * *